Patented July 14, 1931

1,814,859

UNITED STATES PATENT OFFICE

JULIUS SCHWARZ, OF BUDAPEST, HUNGARY

TIPPED LACES

No Drawing. Application filed March 21, 1929, Serial No. 348,975, and in Germany July 26, 1926.

This invention proceeds from the well known method of tipping laces by impregnating such portions of the lace as will be formed into tips with a celluloid solution as distinguished from methods in which sections of solid celluloid are united with the ends of a lace to form tips. The impregnated portions are dried and subjected to the simultaneous action of pressure and heat. The object of the invention is to enhance the stiffness and durability of tips made by the impregnation method and to reduce, at the same time, the costs of the impregnating solution.

When a solution of pure celluloid is used, the tips obtained are not stiff enough and the dry celluloid mass does not adhere sufficiently to the fibres of the lace to prevent the tips from unfolding in use, when the same are pressed to roundness from a flat lace.

I succeeded in eliminating these drawbacks by adding, to the solution of celluloid, some common resin or colophony, or another sort of hard resin which is soluble in the solvent employed. An increased proportion of resin increases the stiffness of the tip and also the adherence of the dry mass to the fibres, but too high a proportion of resin causes particles of the mass to stick to the hot dies in the pressing operation. With common resin or colophony, I obtained best results by adding one pound thereof to four or five pounds of celluloid.

The following is an example of making the solution to be used in accordance with my invention. One pound of common resin is solved in seventeen pounds of acetone, then four and a half pounds of celluloid are added.

The celluloid may first be solved and the resin added, or a solution of resin may be mixed with a solution of celluloid.

The addition of common resin has not any considerable coloring effect upon the celluloid so that the same coloring matters may be used and in the same manner as with solutions of pure celluloid.

The application of the solution to the laces and the formation of the tips are well known in the art.

What I claim is:—

1. As an article of manufacture, a lace having a tip formed of an impregnated end portion of the lace, the impregnating agent consisting of a celluloid solution containing a hard resin soluble in the solvent employed.

2. As an article of manufacture, a lace having a tip formed of an impregnated end portion of the lace, the impregnating agent consisting of an acetonic celluloid solution containing colophony.

3. As an article of manufacture, a lace having a tip formed of an impregnated end portion of the lace, the impregnating agent consisting of an acetonic celluloid solution containing one pound of colophony to four and a half pounds of celluloid.

In testimony whereof I have hereunto set my hand.

JULIUS SCHWARZ.